Figure 1:
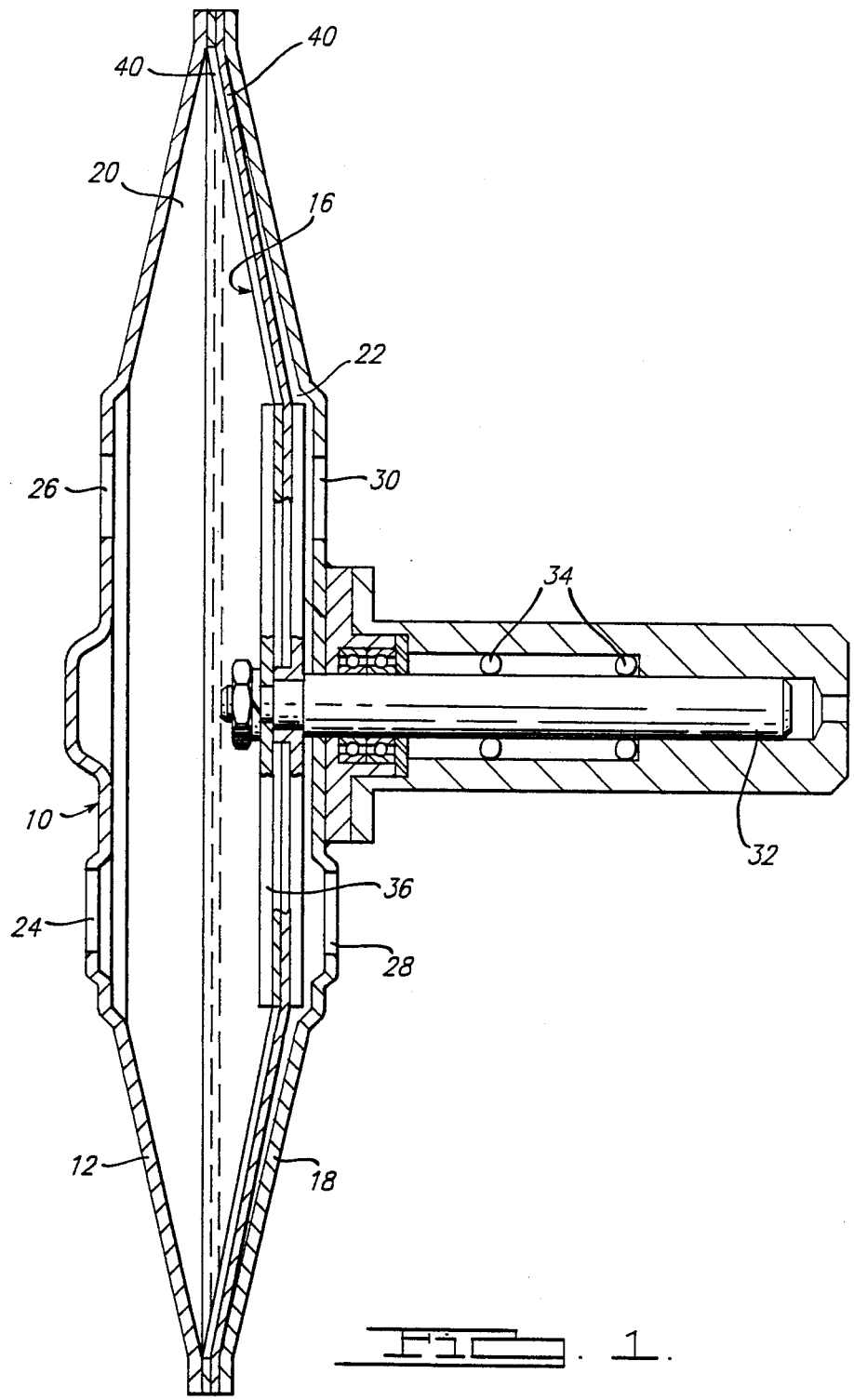

United States Patent [19]

Schatz

[11] Patent Number: 4,797,070

[45] Date of Patent: Jan. 10, 1989

[54] DISPLACEMENT COMPRESSOR FOR SUPERCHARGING OF COMBUSTION ENGINES

[76] Inventor: Oskar Schatz, Tellhohe 14, D-8031 Stockdorf, Fed. Rep. of Germany

[21] Appl. No.: 892,872

[22] Filed: Jul. 28, 1986

Related U.S. Application Data

[63] Continuation of Ser. No. 609,956, May 14, 1984, abandoned.

[30] Foreign Application Priority Data

May 18, 1983 [DE] Fed. Rep. of Germany ....... 3318136

[51] Int. Cl.⁴ .......................... F04B 35/00; F04B 39/00
[52] U.S. Cl. .......................................... 417/380; 92/93; 92/103 M; 417/394; 417/395
[58] Field of Search ............... 417/395, 394, 364, 362, 417/380, 478; 92/103 M, 99, 98 R, 93, 90, 103 SD

[56] References Cited

U.S. PATENT DOCUMENTS

| | | | |
|---|---|---|---|
| 1,466,243 | 8/1923 | Neal | 92/103 M |
| 1,489,349 | 4/1924 | Hampton . | |
| 1,516,630 | 11/1924 | Coberly | 92/103 M |
| 1,843,068 | 1/1932 | Von Wangenheim | 92/103 M |
| 1,895,591 | 1/1933 | Spencer | 92/103 M |
| 2,751,758 | 6/1956 | Parrish | 417/380 X |
| 3,462,073 | 8/1969 | Russell | 417/362 X |
| 3,661,060 | 5/1972 | Bowen | 92/102 |
| 3,668,978 | 6/1972 | Bowen | 92/103 M |
| 4,022,114 | 5/1977 | Hansen, III | 92/98 R |
| 4,111,613 | 9/1978 | Sperry | 92/103 SD X |
| 4,502,847 | 3/1985 | Pozniak et al. | 417/380 |

FOREIGN PATENT DOCUMENTS

| | | | |
|---|---|---|---|
| 570407 | 1/1933 | Fed. Rep. of Germany . | |
| 414711 | 8/1934 | Fed. Rep. of Germany . | |
| 838397 | 5/1952 | Fed. Rep. of Germany . | |
| 2139932 | 2/1973 | Fed. Rep. of Germany . | |
| 3002101 | 7/1981 | Fed. Rep. of Germany | 92/99 |
| 3122957 | 1/1983 | Fed. Rep. of Germany | 417/364 |
| 990698 | 9/1951 | France . | |
| 1586140 | 2/1970 | France . | |
| 2444819 | 7/1980 | France | 417/380 |
| 14168 | 4/1971 | Japan | 417/380 |
| 638923 | 6/1950 | United Kingdom . | |

*Primary Examiner*—Leonard E. Smith
*Attorney, Agent, or Firm*—Harness, Dickey & Pierce

[57] ABSTRACT

An internal combustion engine is connected to a supercharger which is powered by exhaust energy for compressing and feeding of the air charge. The supercharger has at least one exhaust chamber and one air compression chamber both having an intake and an output. A membrane is sandwiched between the two chambers for changing the volume in the charger. The membrane is comprised of tightly fitted single elements which are movable relative to each other and are made from a heat resistant material. The membrane is driven by exhaust gases entering into the exhaust chamber from the internal combustion engine such that the movement of the membrane is synchronized with piston movement of the internal combustion engine to move charged air from the air charge chamber to a piston cylinder.

6 Claims, 4 Drawing Sheets

DISPLACEMENT COMPRESSOR FOR SUPERCHARGING OF COMBUSTION ENGINES

This is a continuation of application Ser. No. 609,956, filed May 14, 1984, now abandoned.

The invention concerns a displacement compressor for supercharging of combustion engines, which has an air charge chamber equipped with one air intake and one air output. A membrane for changing the volume is firmly fastened to the wall.

It is known that membranes can be used instead of pistons for transfer of flow (or conveyance of fluids). When used in compressors, membranes must be of such a composition that they will meet high life expectations despite their three-dimensional form, i.e. they must exhibit a sufficient amount of flexibility. In addition, the membranes in exhaust-driven compressors must be sufficiently heat resistant, inasmuch as they come in contact with hot motor exhaust gases.

Underlying this invention is the task of using a displacement compressor in such a way that, despite the use of membranes, it is equal to demands of operation and has a sufficient life expectancy.

This problem is solved by assembling the membrane from tightly fitting single elements which are movable relative to each other and are constructed from a heat-resistant material.

Assembling it from single elements makes possible a high degree of flexibility while avoiding dangerous stresses which adversely affect the life expectancy. In addition, this facilitates the use of metallic materials for the membrane.

One advantageous refinement (or development) is for the single elements to be closely fitting strips or threads, whereby the strips or threads can be woven into a mesh according to a further design refinement.

According to another variation, the membrane is plate-shaped and movable in an axial direction, whereby the membrane, according to another especially advantageous refinement, consists of two sets of laminations (lamellen) separated by gaps, with the surfaces of both sets of laminations being regularly staggered, and the solid areas of each set overlap the gaps of the other set.

With an exhaust-powered displacement compressor in which the membrane acts as a divider between an exhaust chamber and an air-charge chamber, one advantageous design is for the exhaust chamber and the air compression chamber to be positioned concentrically to each other and divided by a pipe-like or tube-like membrane, whereby, according to a further refinement, the membrane is moved by at least one spring element into a position corresponding to the smallest volume of the exhaust chamber, and whereby, according to another design refinement the single elements lie against each other under the influence of a spring or springs.

With the plate-shaped membrane, another advantageous design refinement is for the center and the rim of the laminations to be fastened by means of a flexible joint and for the center to be positioned relative to the rim around a normal axis to the surface or the lamination in a rotational manner. In this way, buckling and stretching of the laminations during movement of the membrane are avoided, because the distance between the points of connection on the rim and the center con change without placing stress on the lamination.

Preferably the center and the rim are pulled against each other, by means of a spring, in the direction of movement of the lamination.

Inasmuch as the membrane is formed from two sets of laminations, each set can be made individually, according to preference.

By using the following description of examples of alternatives for this invention as shown in the illustration, the invention will be explained in more detail.

Figure 4:
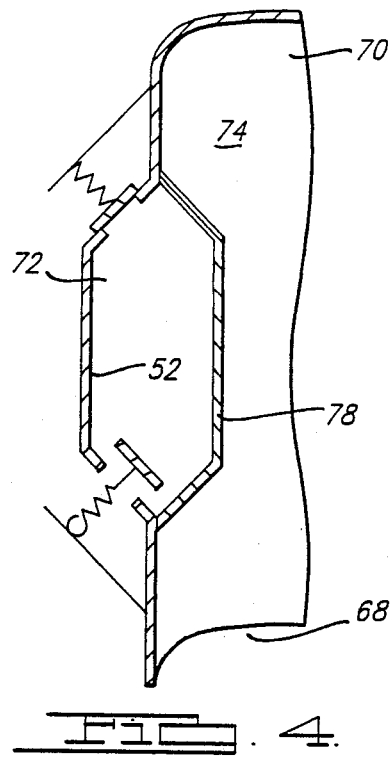

The illustration shows:

FIG. (1) A schematic cross section of a displacement compressor with a plate-shaped membrane FIG. (2) A schematic cross section of a displacement compressor with a cylindrical membrane FIG. (3) A somewhat enlarged view of the displacement compressor along line II-II FIG. (4) A schematic cross section of a displacement compressor with a soft tube membrane without exhaust pressure FIG. (5) The displacement compressor as in FIG. 4 at the beginning of the stroke FIG. (6) The displacement compressor as in FIG. 4 midway through the stroke FIG. (7) The displacement compressor as in FIG. 4 at the end of the stroke FIG. (8) A view of a one-piece set of laminations for forming a membrane FIG. (9) A membrane with center and rim brackets which can rotate against each other.

In FIG. 1 an exhaust-powered displacement compressor (10) is schematically represented. The wall (12) encloses a compression chamber (14) which is divided by a flexible separator in the form of a membrane (16) into an exhaust chamber (20) and an air charge chamber (22). The exhaust chamber (20) has one exhaust gas input (24) and one exhaust gas output (26); the air charge chamber has one exhaust input opening (28) and one exhaust output opening (30).

Figure 8:
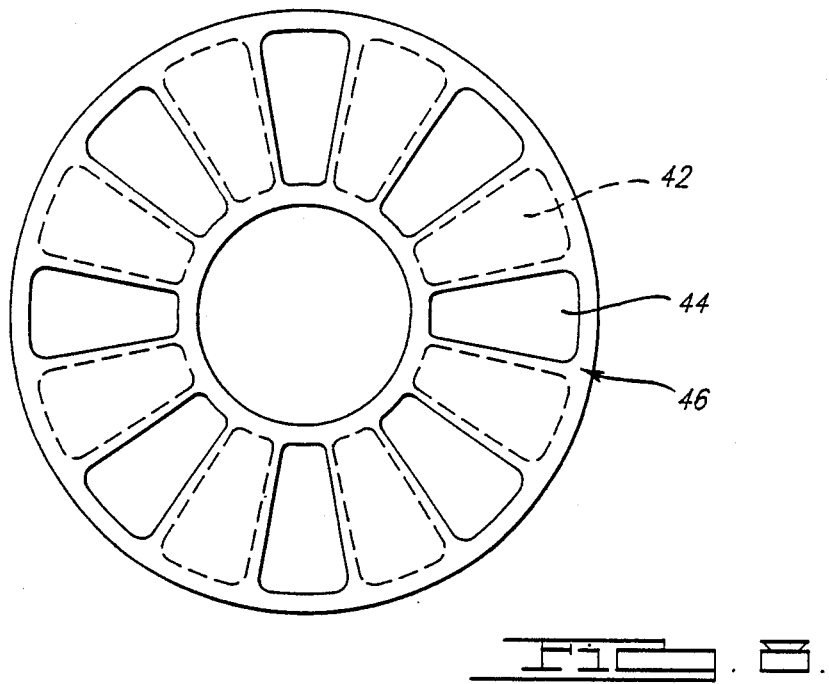

A guide rod (32) projects into the compression chamber (14). The guide rod is connected axially and flexibly to a slide (34) outside the compression chamber. The center of the membrane (16) is connected to the plate-shaped end (36) of the guide rod which is located in the compression chamber (14). The outer edge of the membrane is fastened to the wall (12). The membrane (16) consists of two sets of one piece laminations (40), like those shown in FIG. 8. The laminations (42) are divided by gaps (44) in a circumferential direction, whereby the laminations (42) cover a somewhat larger angle than the gaps(44). The two sets of laminations (40) are joined together into one membrane in such a manner that the solid areas (42) of one set (40) overlap the gaps (44) in the other set. These sets of laminations (40) can be produced from a heat resistant material, especially metal. During an increase in pressure, the laminations (42) will be pressed firmly against the other set (40) in order to cover the gaps (44).

Figure 2:
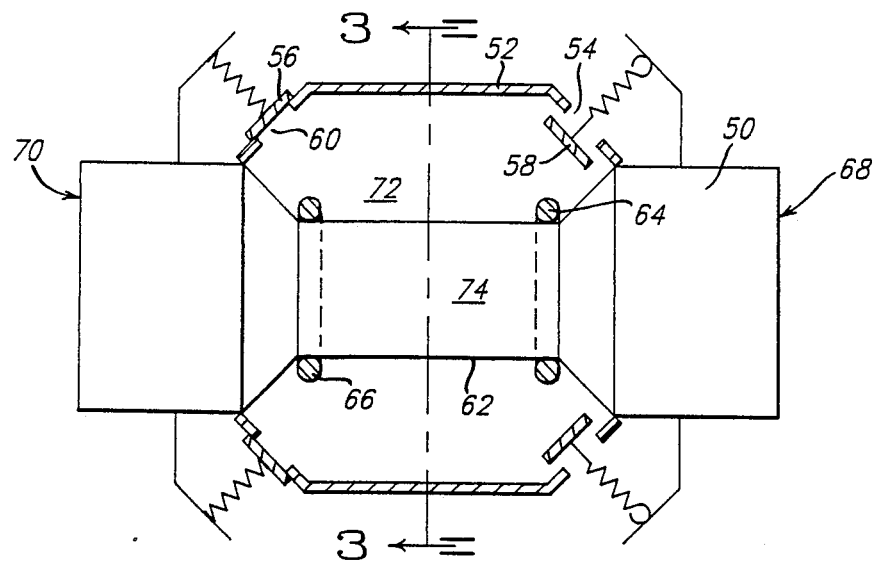

FIG. 2 shows a pipe-like compression chamber (50), which can be inserted in an exhaust pipe. This compression chamber (50) has an enlarged area (52) with a concentric ring of openings (54 and 56 respectively). Openings (54) can be used for air intake, with openings (56) for air charge output. The adjoining check flaps or valves (58 and 60 respectively) are schematically represented. Inside the enlarged area (52) is a coaxially positioned tube-like or pipe-like membrane, which is connected at the beginning and out the end of the enlarged area (52) to the wall of the compression chamber (50)

and which is stretched inward radially e.g. by the use of two ring-shaped springs (64 and 66), i.e. in the direction of its smallest diameter. This arrangement is shown in FIG. 2. The right end of the compression chamber (50) as shown in FIG. 2 corresponds (e.g.) to the exhaust intake as shown in (68); the left end (70) serves as the exhaust output. When negative pressure occurs in the exhaust pipe, that is, when a lack of exhaust pressure exists, the membrane contracts into the position shown and sucks the air charge into the area which forms the air charge chamber(72). When an exhaust pressure wave occurs, the membrane (62) expands, with its inner area (74) corresponding to the exhaust chamber, and which pushes the air charge through the air charge output (56) to the motor cylinder.

Figure 3:
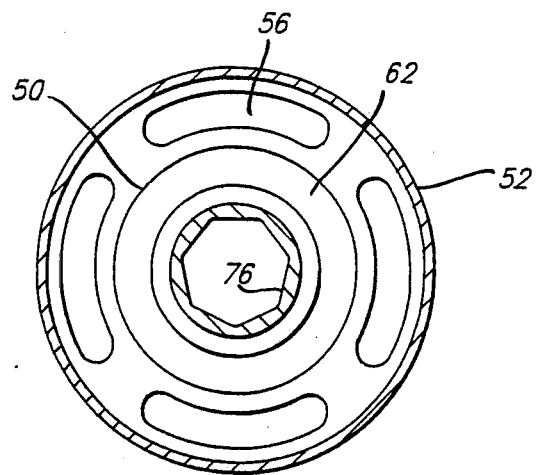

The membrane (62) can be made of axial vertical strips as shown in FIG. 3 and which overlap each other like scales. However, other types of membrane elements can be used, such as cable-like or chain-like elements, whereby the material in the membrane (62) must remain durable in the face of high exhaust gas temperatures-e.g. steel laminations can therefore be used.

Figure 5:
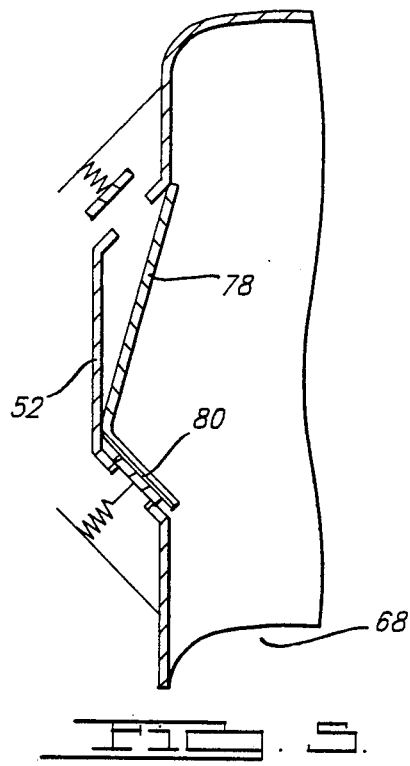
Figure 6:
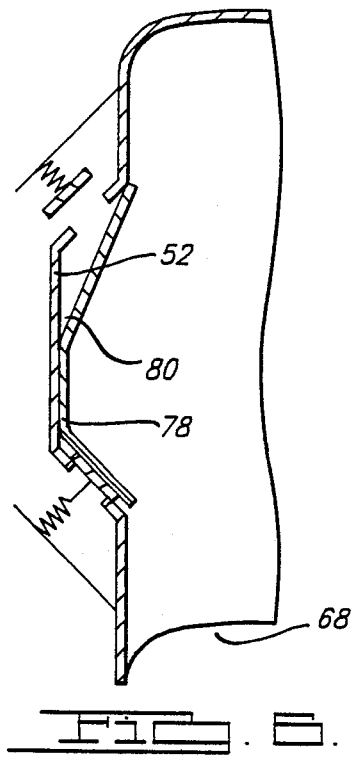
Figure 7:
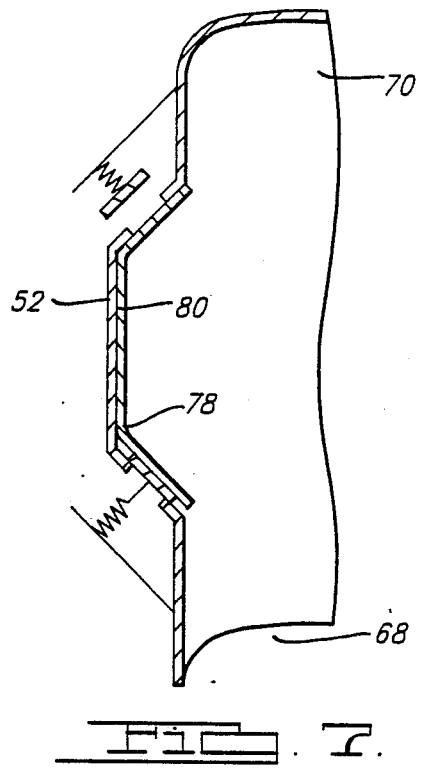

FIGS. 4 through 7 schematically illustrate the function of one alternate form with a soft tube membrane (78), which is equipped to effect an undulatory working movement in accordance with the progression of the exhaust surge. FIG. 4 illustrates the situation prior to the arrival of the surge. In FIG. 5, the surge has arrived and expanded the portion of the membrane which is positioned upstream with regard to the flow of exhaust, such that the membrane (78) is pressed against the wall of the enlarged area (52) and covers the air charge input (54), FIG. 6 shows the surge (of exhaust) halfway through the enlarged area (52), whereby the air charge is pushed along before the expansion (80) which advances with the surge, and the air charge is fed into the motor cylinder which is to be supercharged. A new air charge enters the air charge chamber behind the expanded area (80). FIG. 7 illustrated the condition at the end of the "compressor stroke" before the exhaust surge exits the air compression area. During exhaust gas impulses of relatively long duration, the total length of the membrane can be positioned against the enlarged area (52).

Figure 9:
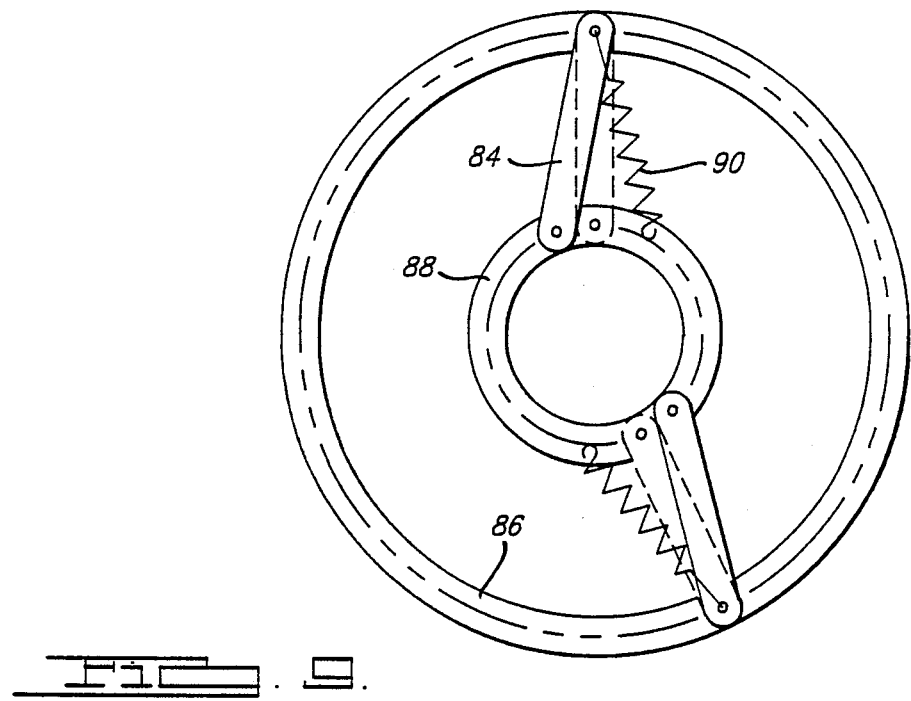

FIG. 9 shows a variation of the membrane in FIG. 1 (16) formed from two sets of laminations (40). With the change from end position to the other, a certain amount of buckling of the membrane occurs in a radial direction. In order to deal with this buckling without placing exceptional stress on the materials, the membrane variation (84) shown in FIG. 9 is provided with ring-shaped center and rim brackets, the ring bracket being labeled (86) and the center bracket labeled (88). The laminations (84) are fastened to the rim (86) and the center(88) and can swivel in parallel axes to the direction of displacement of the membrane (16). If during a stroke movement of the membrane (16) a pressere load occurs along the longitudinal axis of the laminations (84), this leads to a relative movement between the center and rim brackets (86 and 88), whereby the laminations (84) deviate further from the radial position. If the opposite effect occurs during a tensile load, the relative movement between the rim bracket (86) and the center bracket (88) occurs in the opposite direction, and the laminations (84) approach a radial alignment. Preferably the rim bracket (86) and the center bracket (88) will be connected by a spring (90) in such a manner that the laminations (84) bear the tensile load.

The displacement compressor (10) equipped with the membrane (16) can be driven mechanically as well as by means of exhaust gas. Patent claims:

I claim:

1. Displacement compressor for compression of gases, preferably for supercharging internal combustion piston engines having an air charge chamber equipped with one air input and one air output, with a flexible membrane for changing the volume firmly fastened to a wall, distinguished by the fact that the membrane (16, 62, 78) is composed of tightly fitting single elements (40, 76) which are movable relative to each other and are made from a heat-resistant material;

said single element (76) being closely fitting strips or threads;

said membrane being plate-shaped and movable in an axial direction;

said membrane comprised of laminations (84) which are flexibly fastened to a center bracket (88) and an outer bracket (86) such that said center bracket (88) is positioned rotationally on a normal axis to the surface of the lamination, relative to the outer bracket (86);

said membrane being driven by exhaust gases from said internal combustion engine such that movement of said membrane is synchronized with piston movement of said internal combustion engine.

2. Displacement compressor in accordance with claim 1, characterized by the fact that the center bracket (88) and the outer bracket are moved against each other by means of a spring (90) in the direction of tensile load on the laminations (84).

3. Displacement compressor for compression of gases, preferably for supercharging internal combustion piston engines having an air charge chamber equipped with one air input and one air output, with a flexible membrane for changing the volume firmly fastened to a wall, distinguished by the fact that the membrane (16, 62, 78) is composed of tightly fitting single elements (40,76) which are movable relative to each other and are made from a heat-resistant material, said single element (76) being closely fitting strips or threads;

said membrane being plate-shaped and movable in an axial direction; and said membrane (16) comprised of two sets (40) of laminations (42) separated by gaps (44), whereby both sets of laminations (40) are regularly staggered with respect to the surface of the lamination, and the solid areas (42) of one set (40) overlap the gaps of the other set (44), said membrane being driven by exhaust gases from said internal combustion engine such that movement of said membrane is synchronized with piston movement of said internal combustion engine.

4. Displacement compressor in accordance with claim 3 which can be powered by exhaust and wherein the membrane separates an exhaust chamber (74) and an air chargechamber (72) are positioned concentrically to each other and are separated by a pipe-like or tube-like membrane (62,78).

5. Displacement compressor in accordance with claim 4, characterized by the fact that the membrane (62) is moved into a position corresponding to the smallest volume of the exhaust chamber by at least one spring element (64,66).

6. Displacement compression chamber in accordance with claim 4, characterized by the fact that said membranes are individually formed.

* * * * *